US011413945B2

(12) United States Patent
Bashinski et al.

(10) Patent No.: US 11,413,945 B2
(45) Date of Patent: Aug. 16, 2022

(54) TRAILER TARPING SYSTEM

(71) Applicant: Fontaine Commercial Trailer, Inc., Haleyville, AL (US)

(72) Inventors: Connor Bashinski, Birmingham, AL (US); Emmett Timothy Franks, Jr., Double Springs, AL (US); Danny Lynn Avery, Hamilton, AL (US); Roland von Kurnatowski, III, Houston, TX (US); Zachary Schultz, Houston, TX (US); Christopher Kelley, Houston, TX (US)

(73) Assignee: Fontaine Commercial Trailer, Inc., Haleyville, AL (US)

( * ) Notice: Subject to any disclaimer, the term of this patent is extended or adjusted under 35 U.S.C. 154(b) by 141 days.

(21) Appl. No.: 16/990,120

(22) Filed: Aug. 11, 2020

(65) Prior Publication Data
US 2021/0046813 A1 Feb. 18, 2021

Related U.S. Application Data

(60) Provisional application No. 62/963,699, filed on Jan. 21, 2020, provisional application No. 62/885,456, filed on Aug. 12, 2019.

(51) Int. Cl.
*B60J 11/06* (2006.01)
(52) U.S. Cl.
CPC .................. *B60J 11/06* (2013.01)
(58) Field of Classification Search
CPC ... B60J 11/06; B60J 11/02; B60J 7/102; B60J 7/10; B60P 7/04

USPC ............ 296/100.18, 100.01, 100.16, 98, 43, 296/100.12, 100.15
See application file for complete search history.

(56) References Cited

U.S. PATENT DOCUMENTS

| 2,562,300 | A | | 7/1951 | Dingman |
| 3,628,827 | A | * | 12/1971 | Bailey ...................... B60J 5/067 296/100.17 |
| 4,416,484 | A | * | 11/1983 | O'Neill ................ B62D 33/033 52/489.1 |
| 4,655,010 | A | * | 4/1987 | Arquati ..................... E06B 9/40 52/63 |

(Continued)

FOREIGN PATENT DOCUMENTS

| CA | 2202802 C | 2/1999 |
| CA | 2575047 C | 12/2007 |

(Continued)

*Primary Examiner* — Joseph D. Pape
*Assistant Examiner* — Veronica M Shull
(74) *Attorney, Agent, or Firm* — Andrus Intellectual Property Law, LLP

(57) ABSTRACT

A system for covering a load on trailer with a tarp includes a post assembly coupled to a first lateral side of the trailer, a supporting assembly supported in a stake pocket on the first lateral side of the trailer and holding the post assembly vertically upright, and a roller assembly supported at an upper end of the post assembly such that the roller assembly extends horizontally and is aligned with the first lateral side of the trailer. The roller assembly supports a tarp such that the tarp can be pulled up along the first lateral side of the trailer, over the roller assembly, over a load on the trailer, and down toward an opposite second lateral side of the trailer.

18 Claims, 10 Drawing Sheets

(56) References Cited

U.S. PATENT DOCUMENTS

| | | | |
|---|---|---|---|
| 5,186,231 A * | 2/1993 | Lewis | E04F 10/0607 |
| | | | 160/264 |
| 5,658,037 A * | 8/1997 | Evans | B60J 7/085 |
| | | | 160/311 |
| 6,347,826 B1 | 2/2002 | Horner et al. | |
| 6,634,850 B2 | 10/2003 | Christensen | |
| 6,824,189 B1 | 11/2004 | Crabb | |
| 7,819,262 B1 | 10/2010 | Ewan | |
| 7,845,702 B2 * | 12/2010 | Barna | B62D 33/0207 |
| | | | 296/43 |
| 8,534,592 B2 | 9/2013 | Payne | |
| 8,820,717 B2 | 9/2014 | Shrader et al. | |
| 8,876,187 B2 | 11/2014 | Rodriguez et al. | |
| 9,254,776 B2 | 2/2016 | Schmeichel | |
| 2007/0132268 A1 | 6/2007 | Bromberek | |

FOREIGN PATENT DOCUMENTS

| | | |
|---|---|---|
| CA | 2639719 A1 | 3/2009 |
| WO | WO 2018053582 A1 | 3/2018 |

* cited by examiner

TRAILER TARPING SYSTEM

CROSS-REFERENCE TO RELATED APPLICATIONS

This application claims the benefit of U.S. Provisional Application No. 62/885,456, filed on Aug. 12, 2019, and U.S. Provisional Application No. 62/963,699, filed on Jan. 21, 2020, both of which applications are hereby incorporated herein by reference.

FIELD

The present disclosure relates to flatbed trailers/trucks, and more specifically, to systems and methods for covering a load on a flatbed trailer/truck with a tarp.

BACKGROUND

Loads on flatbed trailers or trucks are often covered with tarps to protect the load from damage due to weather, wind, and/or truck exhaust. Often, more than one tarp is needed to cover a load, as loads can reach up to 53 feet in length, while standard tarps generally measure between 20 and 30 feet. Standard tarps can weigh up to 100 pounds.

The most common method of tarping a load on a flatbed trailer or truck is to have the tarps folded and stored on the trailer. The trucker carries each tarp up a ladder and positions the tarp on top of the load. The trucker then unfolds each tarp while it is on top of the load. The trucker then positions the tarp by pulling on its ends while the tarp is on top of the load. The tarp is heavy and can get caught on the load, making this process somewhat dangerous, and often damaging the tarps. To remove the tarps, the trucker un-secures the sides and pulls the tarps off the load onto the ground, after which he refolds each tarp. This removal and storage process can also damage the tarps.

Known stationary tarping systems utilize a crane to drop the tarps onto the trailer. Although such systems eliminate the need for the trucker to climb on top of the load, it is not practical to install a stationary tarping system at every location that requires a load to be tarped or un-tarped.

Another available system includes an arm that is mounted to a tow motor. The tarp is rolled on the arm, positioned over the load, and then pulled onto the load. This system is also impractical, as many companies are unwilling to provide a tow motor to help the driver install the tarps. Additionally, because the tarp is pulled over the load and removed as normal, this process can also damage the tarps.

U.S. Pat. No. 6,634,850 discloses a method and apparatus for applying a sheet material over an object, such as a load on a flatbed trailer. The apparatus is adapted to be mounted onto a forklift. The apparatus includes a framework having a tray portion, and a plurality of first rollers rotatably coupled to the tray portion. The apparatus further includes a drive system for automatically rotating the plurality of first rollers in both clockwise and counterclockwise directions to load the sheet material onto and out of the tray portion. Optionally, the apparatus further includes a second set of rollers rotatably coupled to the tray portion. The plurality of second rollers are located adjacent to and in parallel with the plurality of first rollers so that the rotation of the first rollers causes the rotation of the second rollers to cooperatively feed a sheet material onto and out of the tray portion.

U.S. Pat. No. 6,824,189 discloses an apparatus, system and method for wrapping a tarp around a load. The system generally includes a cart that attaches to a tarp, a rigid pole placed within the tarp connecting the cart to the tarp. Typically, a powered winch includes a strap wrapped around it and the strap is connected to the cart. The winch can be connected to the cart, or to the frame of the trailer. In operation, the powered winch is energized thereby winding the strap around the winch spool, thereby drawing the cart to the trailer load and up one side of the trailer load, across the top and down the other side at which time the tarp is fully placed around the load. Multiple overlapping wheels are connected to the cart. Once the load is covered, the system can be disconnected and stored.

U.S. Pat. No. 7,819,262 discloses an apparatus for covering a payload of a semitrailer with a tarpaulin cover having an overhead structure including a first travel beam and a second travel beam. A carriage is movable on the first travel beam and second travel beam from a position where the carriage rests over the payload to be covered to a position spaced apart in a side-by-side relation with the payload to be covered. A rotatable drum upon which a cable is wound is mounted to the carriage and the connector is used for connecting a free end of the cable to the tarpaulin. An electric system or hydraulic system is used for selectively locating the rotatable drum in opposite directions.

U.S. Pat. No. 8,534,592 discloses an apparatus and method for applying a tarping material to trucking cargo. The tarping material may be formed into a roll with a rod disposed therethrough. The roll may be supported by a frame. The roll can be configured to move vertically with respect to the ground. A trailer carrying trucking cargo can be stationed beneath the frame. The tarping material may be unwound and dispensed from the roll. In order to drape the trucking cargo with the tarping material, the roll may be moved horizontally over the frame in addition to or alternatively to having the trucking cargo driven horizontally with respect to the roll.

U.S. Pat. No. 8,820,717 discloses a system mounted onto a forklift truck for covering and/or uncovering a cargo with a tarpaulin. The system comprises a tube frame assembly having a telescoping frame slidably attached to it. The telescoping frame is configured to be capable of being extendable and/or retractable within the tube frame assembly. The telescoping frame comprises a plurality of rollers configured to be capable of rotating when engaged with the plurality of flexible members and the flexible cover. A powertrain device is installed onto the tube frame assembly for causing to retract and/or to extend the telescoping frame within the tube frame assembly. A winch assembly is configured to be coupled to the tube frame assembly and having a plurality of straps engaged with the tarpaulin to cover and/or uncover the cargo.

U.S. Pat. No. 8,876,187 discloses a device for simply and inexpensively tarping the payload of any truck bed without placing the tarper, the tarp, or the payload in danger of injury. In a preferred embodiment, the disclosed device generally comprises: (1) a rolled or bunched tarp that is installed on a first portable and adjustable riser; (2) a cable and cable crank installed on a second portable and adjustable riser; (3) wherein the cable may be attached to the tarp so that cranking the cable crank will unroll or unbunch the tarp and suspendedly draw the same toward the second riser; and (4) wherein the risers are removable from the truck bed.

U.S. Pat. No. 9,254,776 discloses a roll-up tarp apparatus for a truck box having an open top. The roll-up tarp apparatus includes a roll bar, a flexible tarp secured to the truck box and the roll bar, a converter unit, a motive source and an arm operatively connected to the converter unit, the motive source and the roll bar. The roll bar is operatively connected to the truck box and rotatably movable between the first and second longitudinal sides of the truck box. The tarp is secured to the roll bar so that the tarp can roll up on the roll bar to open the truck box and unroll from the roll bar to cover or close the open top. The roll bar is preferably biased in an unroll direction or toward a closed position. In preferred embodiments, at least one biasing member is operatively connected to the roll bar or the arm.

U.S. Patent Application Publication No. 2007/0132268 discloses an electric tarping system for covering open transport containers comprising a tarp, an electric lift with moveable framework, and an electric motor. The electric lift raises or lowers to provide the tarp with the necessary height needed to adequately cover the open transport container. Once the height is reached, the tarp is either rolled or unrolled to cover or uncover the transport container.

Canadian Patent No. 2202802 discloses a flexible cover that is rolled from a second longitudinal edge of a trailer opening, over spanning members, and any load held in the trailer, to an opposite first longitudinal edge. A harness, which may be a "V"-shaped pair of ropes, is mounted to a mid-point along a longitudinal free edge of the flexible cover. The opposite edge of the flexible cover is fixed to the first longitudinal edge of the trailer. The harness is sized so as to be positionable laterally from the second longitudinal edge to the first longitudinal edge of the flexible cover, across, so as to lay on and extend laterally from, an upper surface of the flexible cover when the flexible cover is unrolled so as to be deployed across the trailer opening. When the flexible cover is rolled-up the harness is correspondingly rolled-up in contact with the upper surface of the flexible cover in the storage position. An elongate flexible lead, such as a throw line is releasably securable to the harness, and is sufficiently long so as to extend across the opening of the trailer to the ground on the side of the trailer when thrown thereover from a first side of the trailer corresponding to the first longitudinal edge of the trailer opening. Furling means as provided for selectively rolling the flexible cover from the deployed position into the storage position.

Canadian Patent No. 2575047 discloses an endless cable tarp extension/retraction system spooled around front and rear pulleys including drive components that are self-contained and encapsulated within an elongated housing that can be removably mounted to the container body using multiple clamp assemblies or mounting bolts disposed within a T-slot in the housing. A front idler pulley to maintain the upper and lower runs of the cable to travel essentially parallel along the length of the container. A self-tensioning rear idler pulley is provided that utilizes a spring to exert an adjustable force against the rear idler pulley.

Canadian Patent Application Publication No. 2639719 discloses a retractable tarping system including an end support surface, a shaft, a tarp, a spool, an end plate assembly, and a cable. The tarp and the spool are operably attached to the shaft. The end plate assembly is attached to the shaft for movement with respect to the first end support surface. The cable is attached to the end support surface and extends at least one time around the first spool.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A system for covering a load on trailer with a tarp according to one example of the present disclosure includes a first supporting assembly configured to be supported in a first stake pocket on a first lateral side of the trailer, a first post assembly configured to be held vertically upright by the first supporting assembly, and a first roller assembly configured to be supported at an upper end of the first post assembly such that the first roller assembly extends horizontally and is aligned with the first lateral side of the trailer. The system also includes a second supporting assembly configured to be supported in a second stake pocket on an opposite second lateral side of the trailer, a second post assembly configured to be held vertically upright by the second supporting assembly, and a second roller assembly configured to be supported at an upper end of the second post assembly such that the second roller assembly extends horizontally and is aligned with the second lateral side of the trailer. The first and second roller assemblies are configured to be aligned with one another to support a tarp, such that the tarp can be pulled up along the first lateral side of the trailer, over the first and second roller assemblies, and down toward the second lateral side of the trailer to cover a load on the trailer.

A system for covering a load on trailer with a tarp according to another example of the present disclosure includes a post assembly configured to be coupled to a first lateral side of the trailer, a supporting assembly configured to be supported in a stake pocket on the first lateral side of the trailer and configured to hold the post assembly vertically upright, and a roller assembly configured to be supported at an upper end of the post assembly such that the roller assembly extends horizontally and is aligned with the first lateral side of the trailer. The roller assembly is configured to support a tarp thereupon such that the tarp can be pulled up along the first lateral side of the trailer, over the roller assembly, over a load on the trailer, and down toward an opposite second lateral side of the trailer.

BRIEF DESCRIPTION OF DRAWINGS

The present disclosure is described with reference to the following Figures. The same numbers are used throughout the Figures to reference like features and like components.

DETAILED DESCRIPTION

Figure 1:
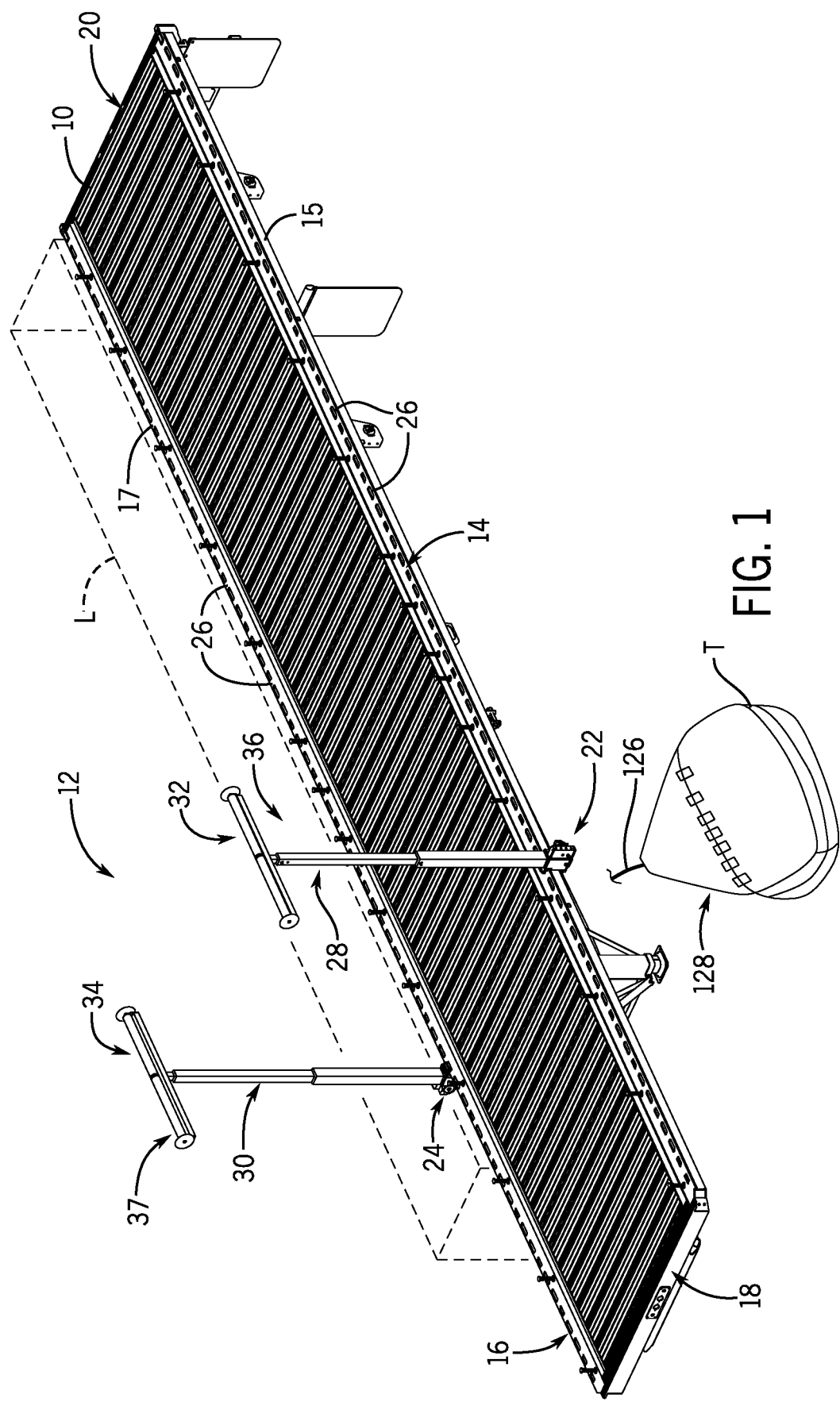
FIG. 1 shows a trailer with system for covering a load thereupon with a tarp.

FIG. 1 illustrates a flatbed trailer 10 with a system 12 for covering a load L on the trailer 10 with a tarp T (shown here as being folded up). The trailer 12 has first and second lateral sides 14, 16, a front end 18, and a back end 20. As is customary, stake pockets 26 are formed in side rails 15, 17 that extend down the respective first and second lateral sides 14, 16 of the trailer 10. The system 12 includes a first supporting assembly 22 configured to be supported in a first stake pocket 26 on the first lateral side 14 of the trailer 10. A second supporting assembly 24 is configured to be supported in a second stake pocket 26 on the opposite second lateral side 16 of the trailer 10. Note that the supporting assemblies 22, 24 are configured be supported in any of the stake pockets 26, but here they are aligned laterally across the trailer 10 for purposes which will be described further herein below.

The system 12 also includes a first post assembly 28 configured to be held vertically upright by the first supporting assembly 22 and a second post assembly 30 configured to be held vertically upright by the second supporting assembly 24. A first roller assembly 32 is configured to be supported at an upper end of the first post assembly 28 such that the first roller assembly 32 extends horizontally and is aligned with the first lateral side 14 of the trailer 10. A second roller assembly 34 is configured to be supported at an upper end of the second post assembly 30 such that the second roller assembly 34 extends horizontally and is aligned with the second lateral side 16 of the trailer 10. Note that the first and second roller assemblies 32, 34 need not be supported directly above the side rails 15, 17 of the trailer 10, but are generally aligned with (or parallel to) the first and second lateral sides 14, 16 of the trailer 10, such as within 10 degrees of parallel with respect to the respective side rails 15, 17 of the trailer 10.

Additionally, the first and second roller assemblies 32, 34 are configured to be aligned with one another to support the tarp T, such that the tarp T can be pulled up along the first lateral side 14 of the trailer 10, over the first and second roller assemblies 32, 34, and down toward the second lateral side 16 of the trailer 10 to cover the load L on the trailer 10. For this reason, the tarp-raising assemblies 36, 37 (including supporting assemblies 22, 24, which hold post assemblies 28, 30, which in turn hold roller assemblies 32, 34) are shown as being aligned laterally across the trailer 10 with respect to one another. This allows the tarp T to be pulled transversely over the load L on the trailer 10, rather than at an angle to the trailer 10. The manner in which the tarp T is lifted onto and pulled over the roller assemblies 32, 34 will be described further herein below.

Figure 3:
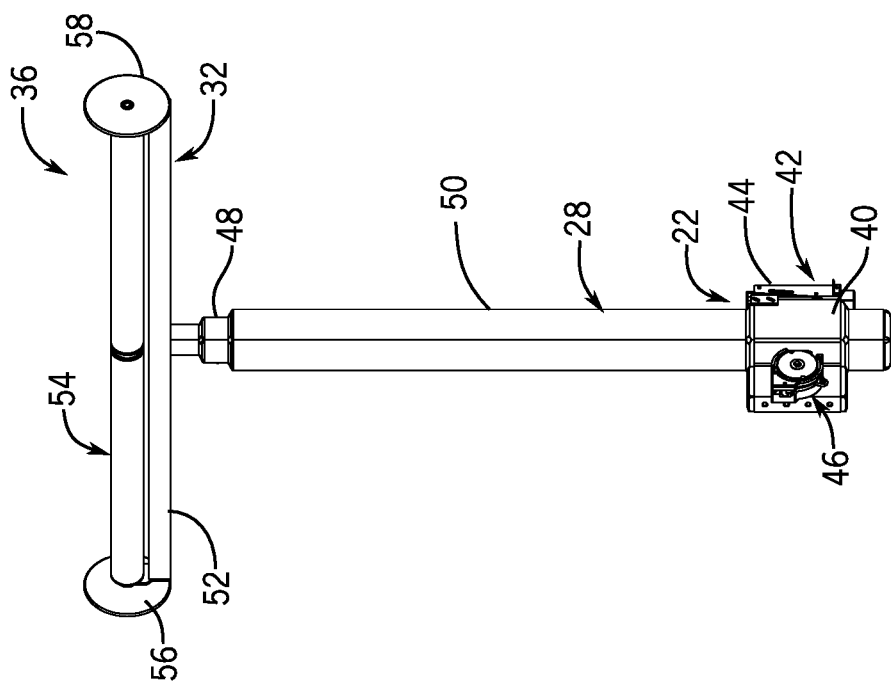
FIGS. 2 and 3 are different perspective views of a tarp-raising assembly of the system.
Figure 2:
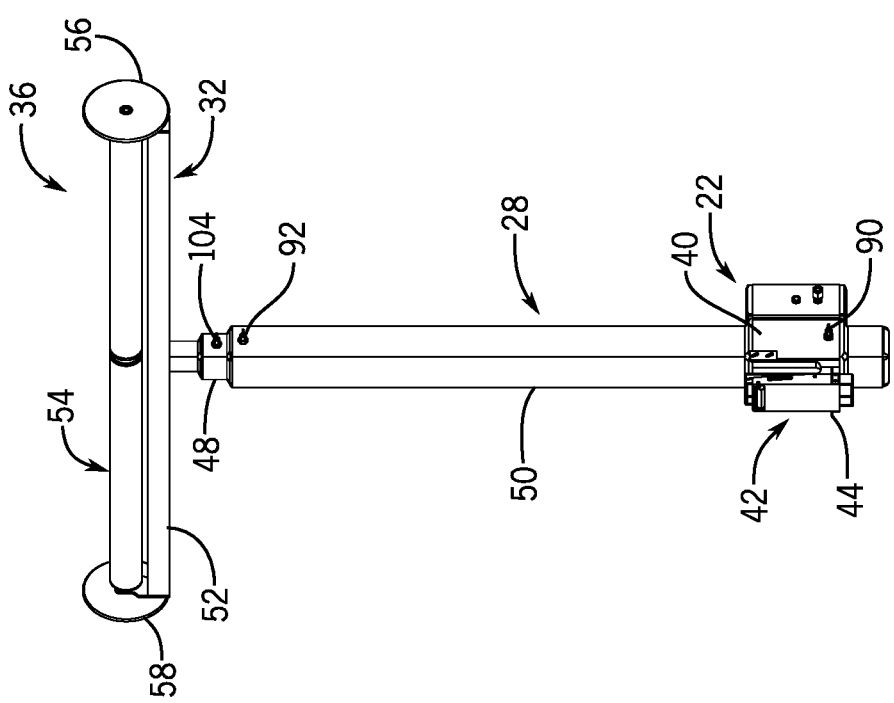

FIGS. 2 and 3 illustrate the assembled tarp-raising assembly 36, including the supporting assembly 22, post assembly 28, and roller assembly 32, from different angles. FIG. 2 shows the tarp-raising assembly 36 from the side that faces toward the trailer 10 when the tarp-raising assembly 36 is installed via a stake pocket 26 on the trailer 10. Broadly, the supporting assembly 22 comprises a hollow main body 40 configured to receive the post assembly 28 therein and a bracket 42 extending from a side of the main body 40. The bracket 42 has an elongated portion 44 extending alongside the main body 40, which elongated portion 44 is configured to be inserted into the stake pocket 26 to connect the tarp-raising assembly 36 to the trailer 10. FIG. 3 shows the tarp-raising assembly 36 from the side that faces away from the trailer 10 when the tarp-raising assembly 36 is installed via a stake pocket 26 on the trailer 10. On this side, the supporting assembly 22 includes a pulling mechanism 46 (opposite the bracket 42), which is configured to pull the tarp T over the trailer 10 in a manner described herein below.

As shown in FIGS. 2 and 3, the post assembly 28 generally comprises at least two telescoping posts 48, 50. Upper post 48 has a cross-sectional size that is smaller than that of lower post 50, such that upper post 48 can be slid within lower post 50. The posts 48, 50 are slidable with respect to each other such that they can be raised and lowered to increase or decrease the overall height of the post assembly 28. The posts 48, 50 are also slidable together with respect to the supporting assembly 22, such that the combined height of the posts 48, 50 can be increased or decreased. In the present example, the posts 48, 50 are manually lifted and lowered with respect to one another and with respect to the supporting assembly 22. However, the posts 48, 50 could be mechanically lifted and lowered, such as by way of a pulley system including a clutch or a ratcheting mechanism including a spur gear and a drive assembly. Although only two posts 48, 50 are shown, three or more posts could be provided depending on their length.

As also shown in FIGS. 2 and 3, the roller assembly 32 comprises a horizontally extending beam 52 coupled to the upper end of the post assembly 28, more specifically to the upper end of upper post 48. At least one horizontally extending roller 54 is supported by the beam 52. First and second wheels 56, 58 are supported at opposite ends of the at least one roller 54. The first and second wheels 56, 58 each have an outer diameter that is larger than an outer diameter of the at least one roller 54.

Now turning to FIGS. 4-7, the supporting assembly 22 will be described in more detail. The supporting assembly 22 comprises a rectangular hollow main body 40, which defines a rectangular opening 60 (FIG. 6) extending vertically there through. In other examples, the main body 40 could be cylindrical or could have any other cross-sectional shape suitable for the purpose described herein. The opening 60 could also have any cross-sectional shape, which could be the same as or different from the cross-sectional shape of the main body 40. Preferably, the cross-sectional shape of the opening 60 matches the outer cross-sectional shape of the lower post 50, such that the lower post 50 can fit inside and slide with respect to the opening 60. A bracket 42 extends from the main body 40. The bracket 42 has an elongated portion 44 extending alongside the main body 40. More specifically, the elongated portion 44 extends from a lower portion of the main body 40 and upwardly alongside the main body 40, forming a somewhat "U" shape with the side of the main body 40. In this example, the bracket 42 is formed integrally as part of the main body 40, but the bracket 42 could instead be welded, bolted, or otherwise attached to the main body 40.

Figure 8:
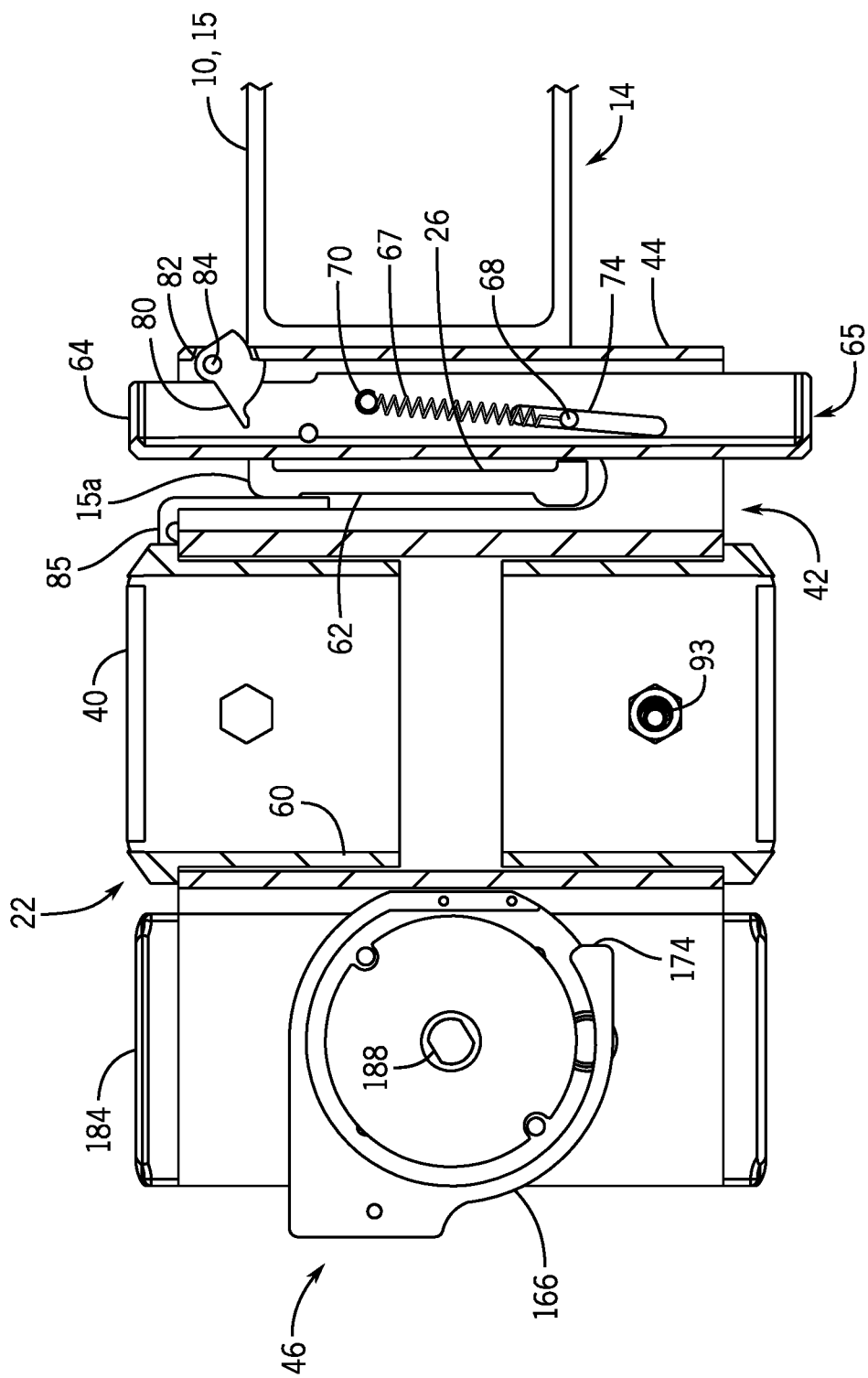
FIG. 8 is a cross-sectional view of the supporting assembly shown installed in a stake pocket on a trailer.

As shown in FIG. 8, the elongated portion 44 of the bracket 42 is configured to be inserted into a stake pocket 26 on the trailer 10 from below the stake pocket 26. Thus, the outer edge 62 of the trailer 10 (i.e., the portion of the side rail 15 on the outside of the hole defining the stake pocket 26) is located within the "U" formed by the bracket 42 and main body 40. In such a configuration, the main body 40 is suspended outwardly of the respective first or second lateral side 14, 16 of the trailer 10. This fact, along with the fact that the bracket 42 is installed from below the stake pocket 26, allows for the supporting assembly 22 to be installed on a trailer 10 even when the load L takes up the full width of the trailer 10, because the supporting assembly 22 does not interfere with the load L.

Referring to FIGS. 4-7 as well as FIG. 8, the supporting assembly 22 also comprises a shim 64 configured to slide vertically and horizontally with respect to the elongated portion 44 of the bracket 42 such that a combined lateral width of the elongated portion 44 of the bracket 42 and the shim 64 can be adjusted to fill a width of the stake pocket 26. To install the supporting assembly 22 in the stake pocket 26, the user pushes downwardly on a pair of handles 66 attached to the bracket 42, while pushing upwardly on the bottom surface 65 of the shim 64, as shown by the arrows in FIG. 4. This moves the shim 64 upwardly against the force of a spring 67 (FIG. 8) attached between a pin 68 that is fixed to the elongated portion 44 and a pin 70 that is fixed to the shim 64, to the position shown in FIG. 6. At this position, the pin 70, which is fixed to the shim 64, reaches the end of its upward travel within a slot 72 in the elongated portion 44, and the pin 68, which is fixed to the elongated portion 44, reaches the extent of its downward travel within a slot 74 in the shim 64. This describes the vertical travel of the shim 64 with respect to the bracket 42.

Figure 4:
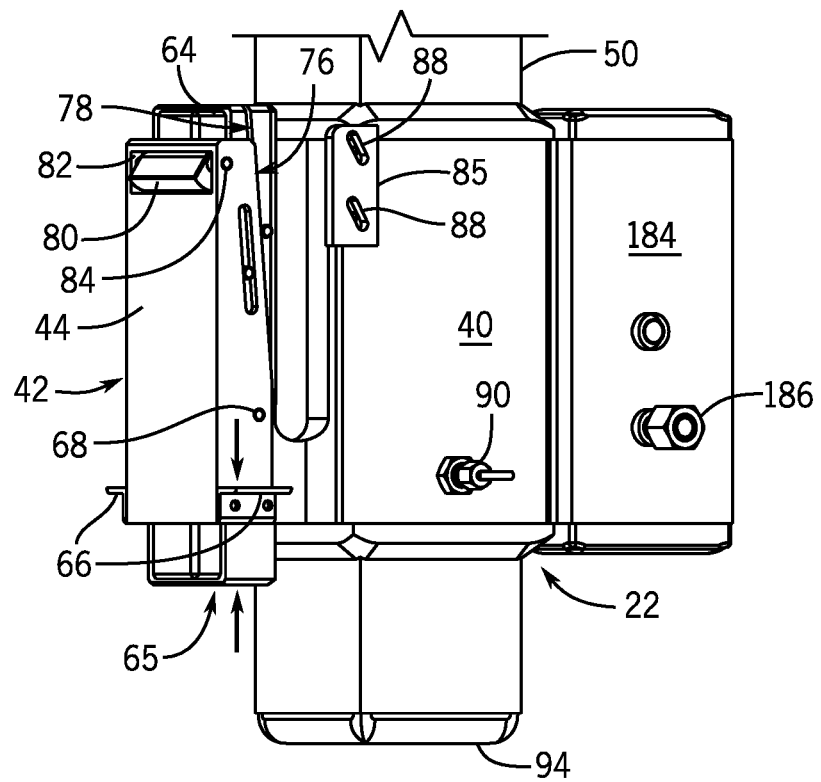
FIG. 4 is a perspective view of the lower end of the tarp-raising assembly as shown in FIG. 2.
Figure 5:
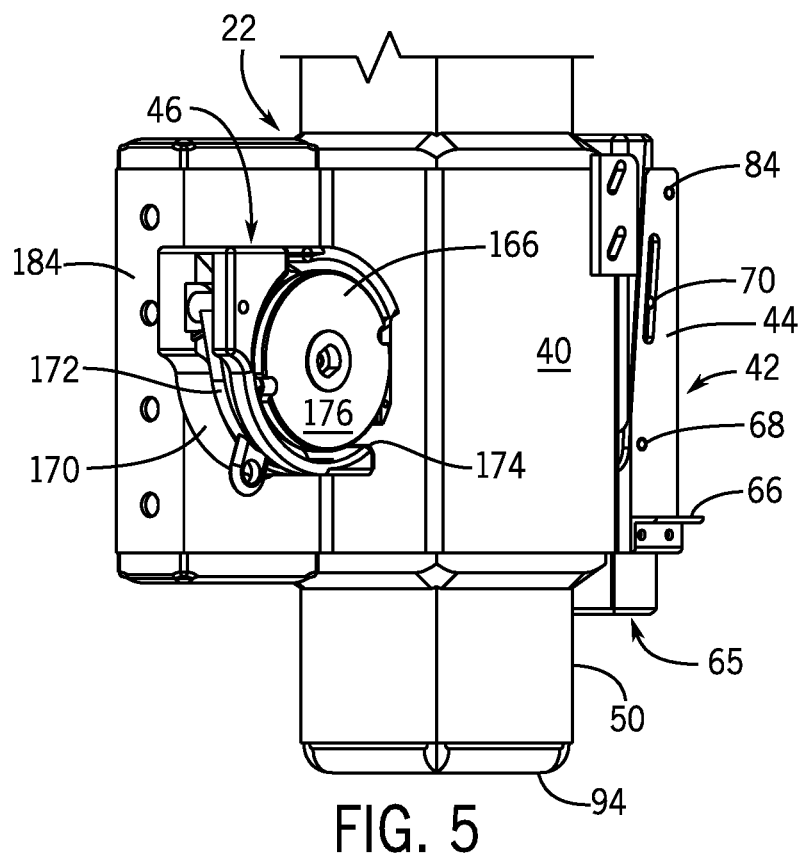
FIG. 5 is a perspective view of the lower end of the tarp-raising assembly as shown in FIG. 3.
Figure 6:
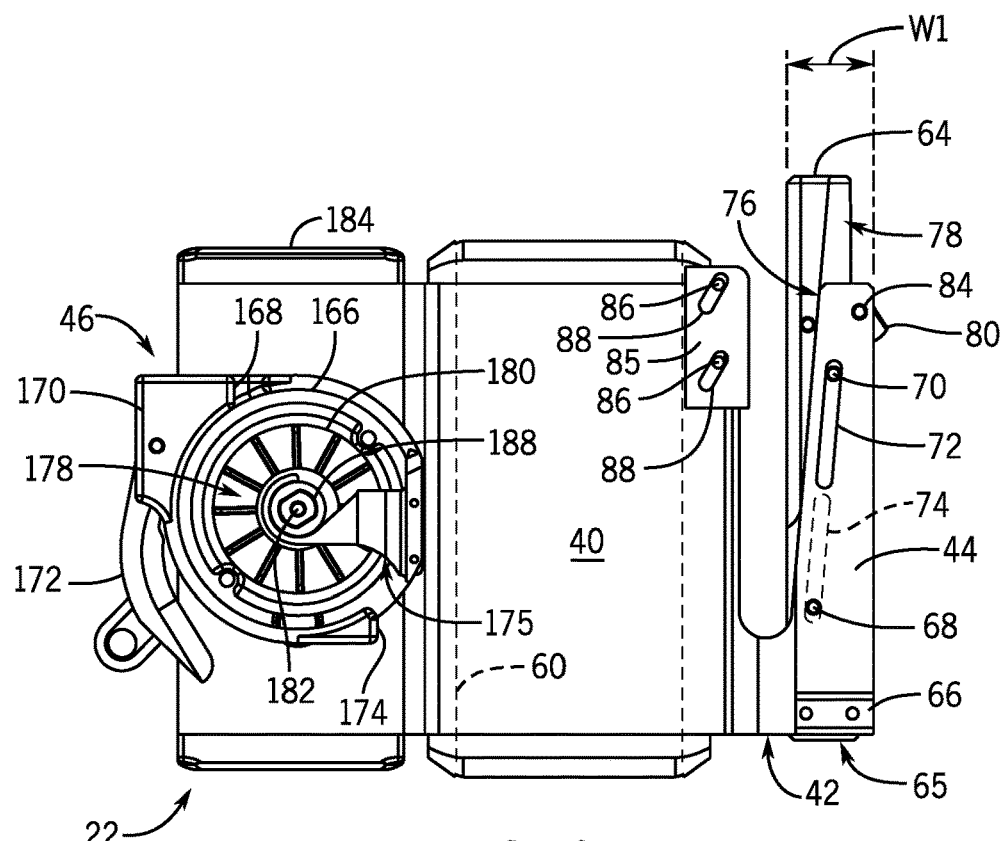
FIG. 6 is a side view of a supporting assembly of the tarp-raising assembly, with certain components in first configurations.

As seen best in FIGS. 4 and 6, the elongated portion 44 of the bracket 42 has an angled surface 76 that faces the main body 40. The angled surface 76 is angled away from the main body 40 of the supporting assembly 22, such that the "U" between the two is wider toward the top than toward the bottom. The shim 64 is manufactured with a corresponding angled surface 78, which can be formed as a ledge on the outer side surfaces of the shim 64, and which faces the angled surface 76 of the elongated portion 44 of the bracket 42. The above-noted slots 72 and 74 are angled with respect to vertical at the same angle as the angled surface 76 of the elongated portion 44 and the angled surface 78 of the shim 64. As the shim 64 is pushed upwardly with respect to the elongated portion 44, the shim 64 is constrained by interactions of the angled surfaces 76, 78 with each other and by the pin 68 in slot 74 and pin 70 in slot 72 to move at the same angle at which these features are angled. Thus, the shim 64 also moves horizontally as it moves vertically.

Figure 7:
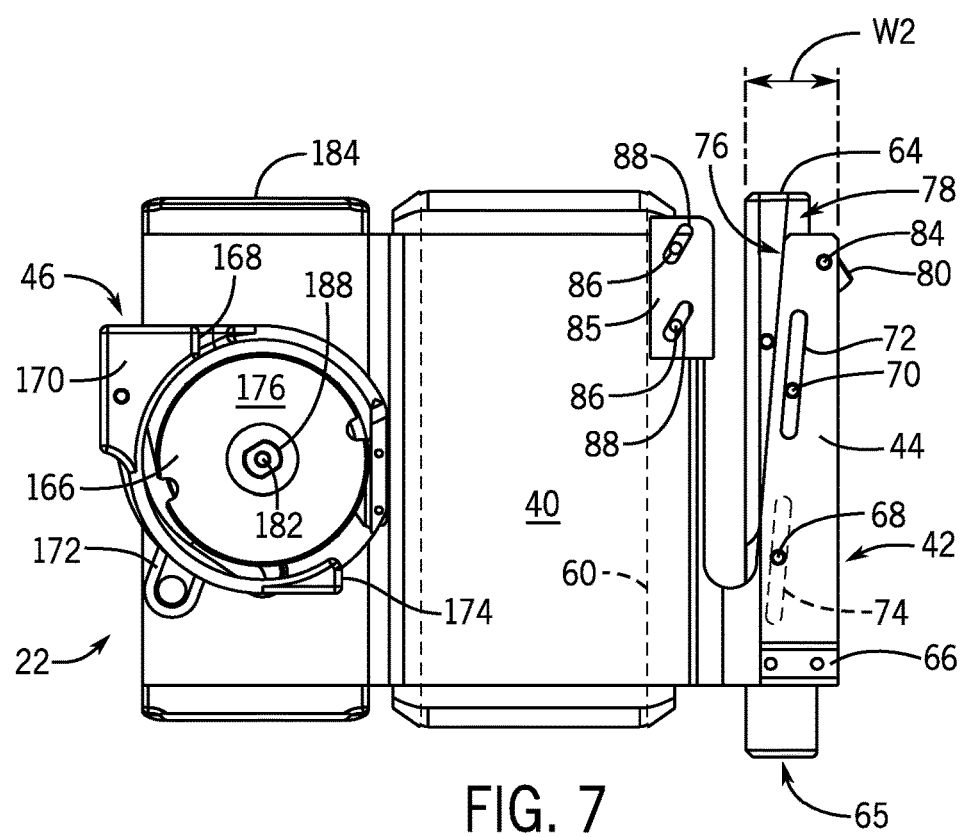
FIG. 7 is a side view of the supporting assembly, with certain components in alternative, second configurations.

More specifically, as shown by comparison of FIGS. 6 and 7, when the shim 64 reaches the upward extent of its travel (FIG. 6), it is also shifted horizontally further away from the main body 40 than when the shim 64 is not at the upward vertical extent of its travel. This means that the combined lateral width of the elongated portion 44 of the bracket 42 and the shim 64 is less when the shim 64 reaches the upward extent of its travel (see W1, FIG. 6) than when the shim 64 is vertically lower with respect to the elongated portion 44 (see W2, FIG. 7). While the shim 64 is in the "narrow" position shown in FIG. 6, the shim 64 and elongated portion 44 can together be inserted into the stake pocket 26 as long as the width of the opening defining the stake pocket 26 is wider than the combined total width W1 of the elongated portion 44 of the bracket 42 and the shim 64. The shim 64 and elongated portion 44 are sized to accommodate nearly all standard stake pocket sizes for flatbed trailers when in the "narrow" position.

As the shim 64 and elongated portion 44 of the bracket 42 are inserted into the stake pocket 26, a cam lock 80 is pushed by the presence of the trailer's side rail 15 through an aperture 82 (FIGS. 4, 8) in the outer face of the elongated portion 44 of the bracket 42 and into the body of the shim 64, against the force of a torsion spring (not shown) wound around a pin 84 about which the cam lock 80 pivots. Once the shim 64 and elongated portion 44 of the bracket 42 exit from the top of the stake pocket 26, the cam lock 80 pivots about the pin 84 out of the shim 64 and aperture 82 under the force of the torsion spring. The cam lock 80 then rests on the top surface of the side rail 15, as shown in FIG. 8, preventing the supporting assembly 22 from slipping down out of the stake pocket 26, and providing a visual cue to the user that the shim 64 and elongated portion 44 of the bracket 42 have been inserted far enough into the stake pocket 26.

Once the shim 64 and elongated portion 44 of the bracket 42 are inserted into the stake pocket 26 and the cam lock 80 rests on top of the side rail 15, the user then releases force on the bottom surface 65 of the shim 64, allowing the spring 67 to pull the shim 64 downwardly with respect to the elongated portion 44 of the bracket 42. The angled surface 78 of the shim 64 slides along the angled surface 76 of the elongated portion 44 of the bracket 42, while the pins 68, 70 travel in their respective slots 74, 72. The shim 64 therefore also moves horizontally toward the main body 40 of the supporting assembly 22, thus increasing the combined width (e.g., width W2) of the shim 64 and elongated portion 44 of the bracket 42 until the shim 64 is prevented from moving further by the portion 15a of the side rail 15 located outwardly of the stake pocket 26. This further secures the supporting assembly 22 in the stake pocket 26 and prevents the supporting assembly 22 from wobbling with respect to the trailer 10. The shim 64 and elongated portion 44 of the bracket 42 are sized such that they are able to fill nearly all standard stake pocket sizes for flatbed trailers when the shim 64 is somewhere between the "narrow" position (width W1) and in the "wide" position at the lower end of its travel.

After the cam lock 80 and shim 64 are held in place by force from the respective torsion spring and spring 67, tabs 85 coupled to the main body 40 can be shifted to rest against the outer edge 62 of the side rail 15, as shown in FIG. 8. While FIG. 8 is a cross-section and therefore only shows the far tab 85, the same tab 85 is present on the opposite side of the main body 40. The tabs 85 are held to the main body 40 by fasteners such as screws or bolts (not shown), which extend through screw holes 86 in the main body 40. The tabs 85 are shown in a position used during installation in FIG. 6, in which the fasteners would be located at the top of angled slots 88 in the tabs 85, such that the tabs 85 are more or less flush with the outer surface of the main body 40 and will not interfere with passage of the outer edge 62 of the side rail 15 into the "U" shape between the bracket 42 and the main body 40. However, once the supporting assembly 22 is in place in the stake pocket 26, the fasteners can be loosened to allow the tabs 85 to be moved upwardly and outwardly away from the main body 40, as constrained by the fasteners within angled slots 88. Once the tabs 85 contact the outer edge 62 of the side rail 15 (FIG. 8), the fasteners can be tightened in the holes 86 to maintain the tabs 85 in place. Firm contact between the tabs 85 and the side rail 15 reduces stress on the supporting assembly 22. In some examples, additional shims, tabs, or similar mechanisms may also be provided to fill the gaps between the bracket 42 and the inside surface of the stake pocket 26 in the longitudinal direction of the trailer 10 and thereby further reduce stress and/or wobbling.

Figure 9:
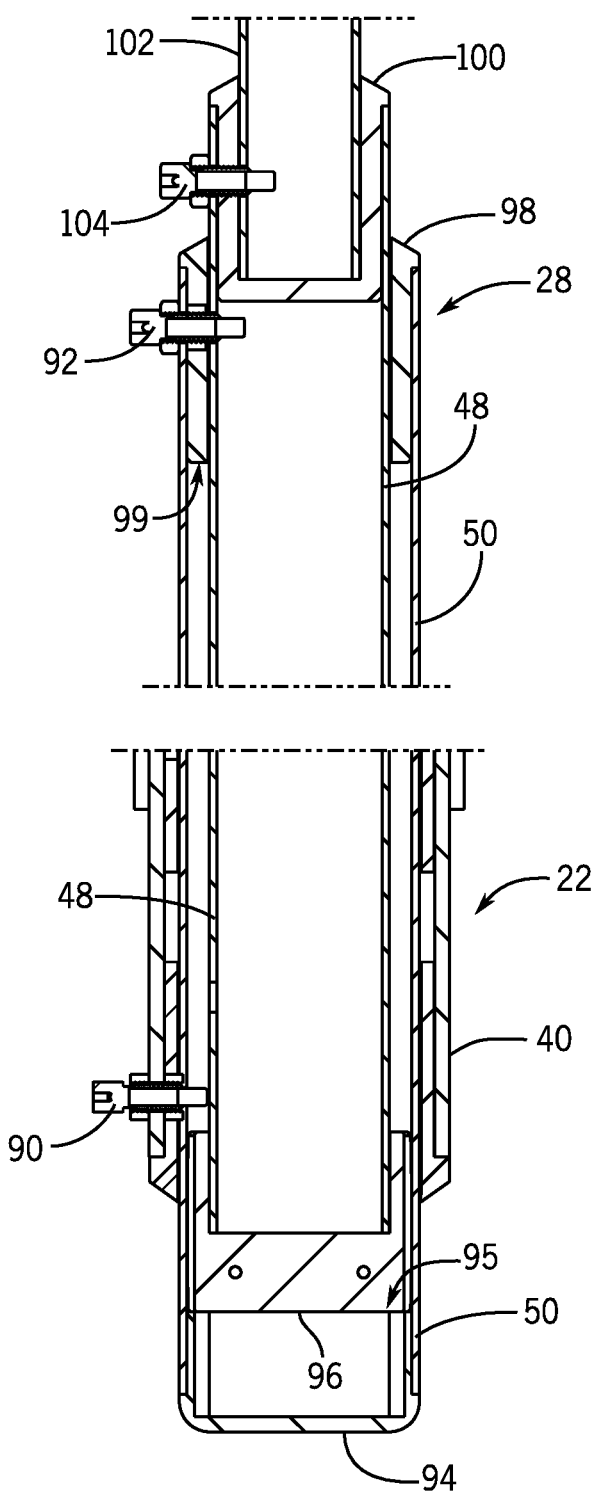
FIG. 9 is a cross-sectional view of portions of a post assembly of the tarp-raising assembly.

The post assembly 28 can be assembled with the supporting assembly 22 before the supporting assembly 22 is installed on the trailer 10. The upper and lower posts 48, 50 can be sized such that, if the post assembly 28 is in its lowered position, with both the lower post 50 lowered with respect to the supporting assembly 22 and the upper post 48 lowered with respect to the lower post 50, the bottom end of the lower post 50 will be able to rest on the ground while the upper end of the post 50 extends above the trailer's deck. This allows the user to rest the post assembly 28 in an upright position next to the trailer 10, and requires the user to lift the supporting assembly 22 only, while the post assembly 28 remains on the ground. Such relative movement between the supporting assembly 22 and the post assembly 28 is facilitated by the outer surface of the lower post 50 fitting closely within the opening 60 through the main body 40 of the supporting assembly 22 in a slidable manner, as described herein above. Referring to FIGS. 2 and 9, the lower post 50 can be fixed with respect to the main body 40 by way of a spring lock 90 extending through an aperture 93 (FIG. 8) in the main body 40 and receivable in an aperture or one of a plurality of apertures in the wall of the lower post 50. As mentioned, the upper post 48 is also slidable with respect to the lower post 50. The relative position of the upper and lower posts 48, 50 can be fixed by way of a spring lock 92 extending through an aperture in the lower post 50 and receivable in an aperture or one of a plurality of apertures in the upper post 48. In other examples, pins, bolts, or other fasteners could be used to fix the position of the lower post 50 with respect to the main body 40 and/or the upper post 48 with respect to the lower post 50, instead of spring locks 90, 92.

In FIG. 9, the lower post 50 is in its raised position with respect to the main body 40 of the supporting assembly 22, and the upper post 48 is in its lowered position with respect to the lower post 50. The lower post 50 has a lower end cap 94, and the upper post 48 has a lower end cap 96. The lower ends caps 94, 96 are designed to limit the downward travel of the upper post 48 with respect to the lower post 50, as the lower end cap 96 on the upper post 48 contacts an upper surface 95 of the lower end cap 94 on the lower post 50. Upward travel of the upper post 48 is also limited by the lower end cap 96, by way of interaction thereof with a bottom surface 99 of an upper end cap 98 provided at the upper end of the lower post 50. Furthermore, the upper post 48 is provided with its own upper end cap 100, into which a supporting post 102 of the roller assembly 32 is inserted and held by way of a spring lock 104 or other known fastener. The roller assembly 32 can be installed into the upper end cap 100 of the upper post 48 after the post assembly 28 and supporting assembly 22 are installed on the trailer 10. This means the user does not need to lift the roller assembly 32 with the post assembly 28 and supporting assembly 22 during installation. Downward travel of the supporting post 102 is limited by the presence of the upper end cap 100. The end caps 94, 96, 98, and 100 not only provide stops to upward and downward travel of the components, but also serve as dust caps that prevent debris from entering the post assembly 28. The end caps 94, 96, 98, and 100 may be provided with integral wear strips (not shown) to facilitate sliding between the components.

Figure 10:
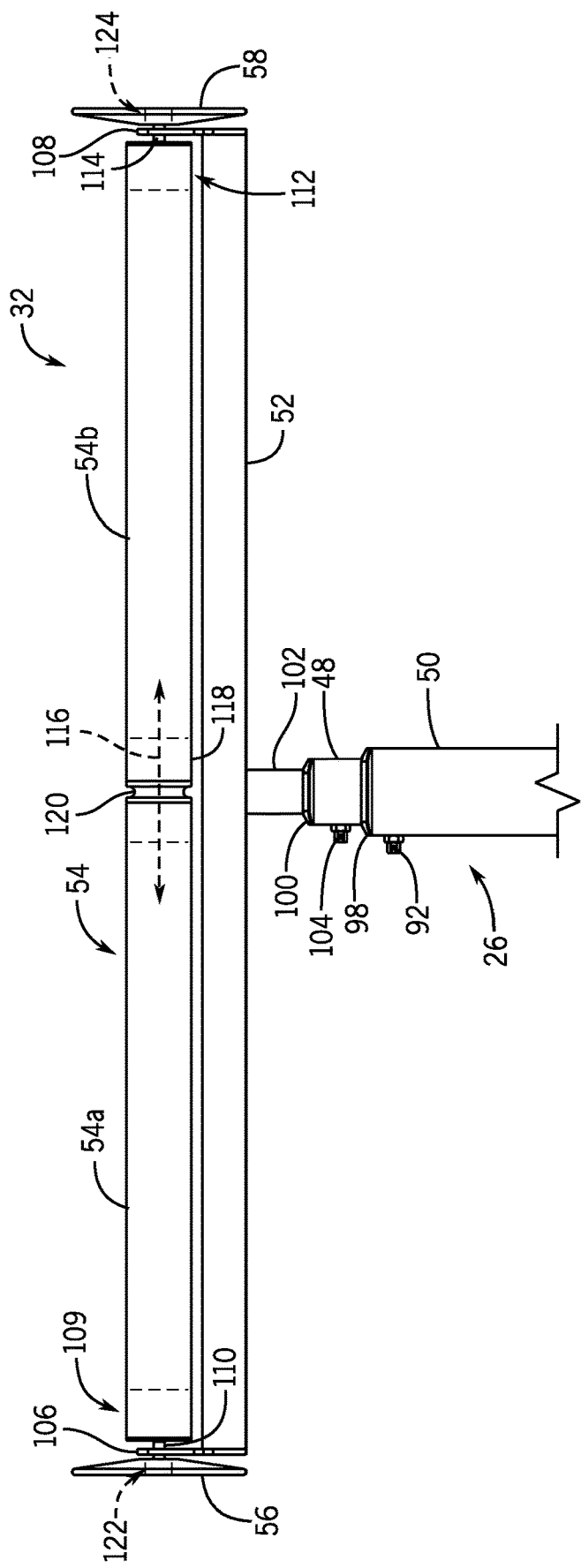
FIG. 10 shows a roller assembly of the tarp-raising assembly installed on the post assembly.
Figure 11:
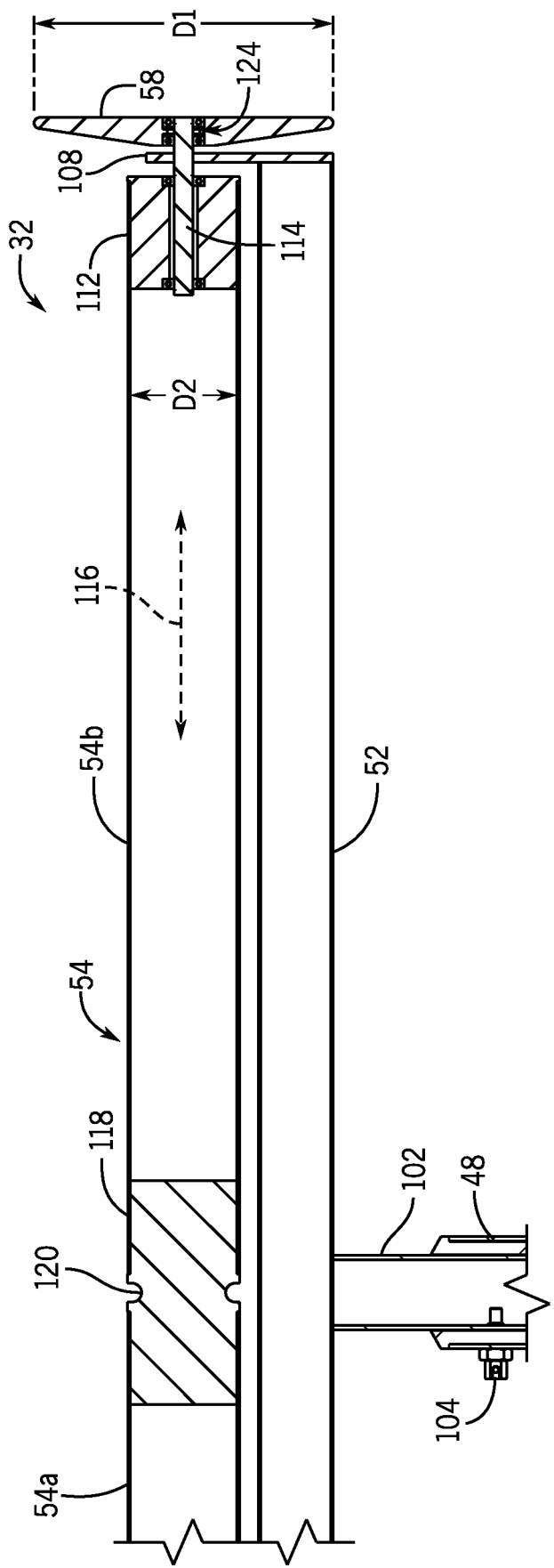
FIG. 11 shows a partial cross-sectional view through the roller assembly of FIG. 10.

As noted, and with reference now to FIGS. 10 and 11, the roller assembly 32 is installed on top of the post assembly 28 by insertion of the supporting post 102 into the upper end cap 100 on the upper post 48. The supporting post 102 is coupled to a horizontally extending beam 52, which here is a box beam, but could be any type of beam, pole, or post suitable for supporting the at least one roller 54. A first bracket 106 is coupled to a first end of the beam 52 and a second bracket 108 is coupled to a second end of the beam 52, such as by welding, bolting, or other suitable attachment methods/devices. A first bearing 109 is supported above the beam 52 by a first spindle 110 supported by the first bracket 106. A second bearing 112 is supported above the beam 52 by a second spindle 114 supported by the second bracket 108. The at least one horizontally extending roller 54 is supported by the first and second bearings 109, 112 and rotatable about an axis of rotation 116 defined by the first and second spindles 110, 114. More specifically, the at least one roller 54 includes a first roller 54a and a second roller 54b, connected by a generally cylindrical member 118. The connecting member 118 has an outer diameter sized to fit within an inner diameter of the rollers 54a, 54b, which are shown as hollow tubes. The connecting member 118 has a circumferential groove 120, the purpose of which will be described herein below. In another example, a single roller is provided extending between the brackets 106, 108, and the circumferential groove 120 is machined or otherwise provided therein.

The roller assembly 32 also has first and second wheels 56, 58 supported by the respective first and second spindles 110, 114 opposite the respective first and second bearings 109, 112 and rotatable about the axis of rotation 116. The wheels 56, 58 are supported on the spindles 110, 114 by bearings 122, 124 as well, thus allowing the wheels 56, 58 to spin smoothly about the axis of rotation 116. Although the bearings 109, 112, 122, 124 are shown herein as ball bearings, they could instead be roller bearings, bushings, or other bearings suitable for their intended purpose. When the tarp-raising assembly 36 is installed on the trailer 10, the axis of rotation 116 is generally aligned with (i.e., within 10 degrees of parallel to) the lateral side edge of the trailer 10. Due to the bearings 109, 112, 122, 124, the rollers 54a, 54b and the wheels 56, 58 spin about the axis of rotation 116 on the spindles 110, 114 to allow the tarp T supported thereon to easily move over the roller assembly 32 transverse to the trailer 10. The first and second wheels 56, 58 each have an outer diameter D1 that is larger than an outer diameter D2 of the at least one roller 54, such that the presence of the wheels 56, 58 prevents the tarp T from slipping off the free ends of the rollers 54a, 54b (i.e., in the longitudinal direction of the trailer 10). If the tarp T does slip over the wheels 56, 58, their larger diameter D2 prevents the tarp T from folding over and wrapping around the free ends of the rollers 54a, 54b. The larger diameter D2 of the wheels 56, 58 also allows the user to move the unassembled roller assembly 32 by flipping it upside down, holding the supporting post 102, and rolling the roller assembly 32 on the ground by pushing or pulling on the supporting post 102. The wheels 56, 58 can be made of metal, a polymer, an elastomer, and/or combinations thereof.

Although it will not be described herein, the second supporting assembly 24 can be the same as the first supporting assembly 22, the second post assembly 30 can be the same as the first post assembly 28, and the second roller assembly 34 can be the same as the first roller assembly 32. Thus, either of the tarp-raising assemblies 36 or 37 can be installed on either lateral side 14, 16 of the trailer 10, and the tarp T can be lifted from either lateral side 14, 16 of the trailer 10 to the other regardless of which tarp-raising assembly 36, 37 is installed on which lateral side 14, 16 of the trailer 10.

After the supporting assemblies 22, 24 and post assemblies 28, 30 are installed via laterally corresponding stake pockets 26, and after roller assemblies 32, 34 are installed at the top of the post assemblies 28, 30, the post assemblies 28, 30 can be raised to heights sufficiently above the load L that the tarp T will not interfere with the load L as it passes there over. A fully raised position of both tarp-raising assemblies 36, 37 is shown in FIG. 1. However, intermediate positions are possible, such as if the upper posts 48 are not fully raised with respect to the lower posts 50 and/or if the lower posts 50 are not fully raised with respect to the supporting assemblies 22, 24.

Figure 12:
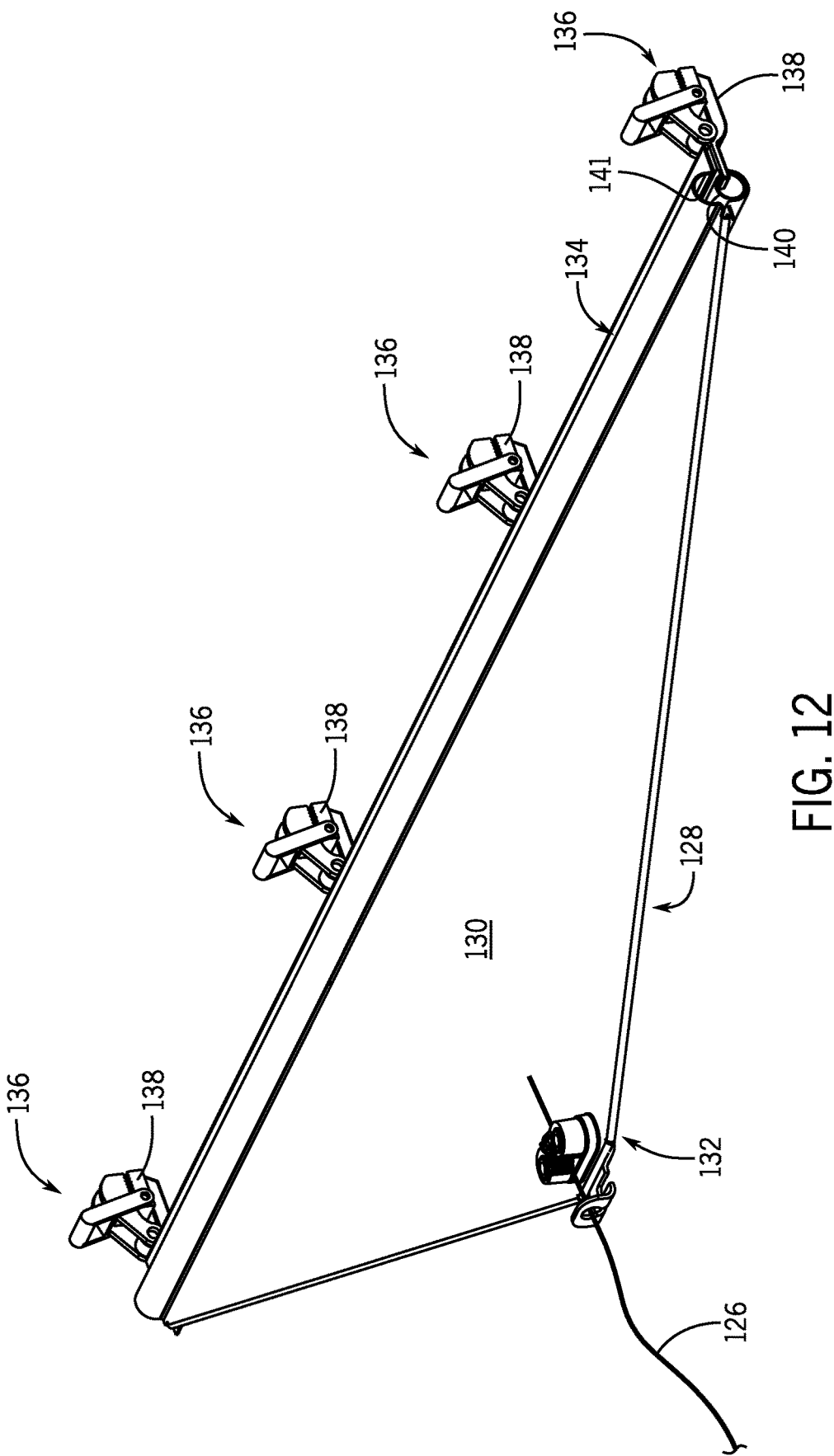
FIG. 12 illustrates an attachment assembly of the tarp-raising assembly.

One aspect of the supporting assemblies 22, 24 that may be different is the presence of a pulling mechanism 46 thereon, although the supporting assemblies 22, 24 may otherwise be identical as noted herein above. The reason for this is explained below. Referring to FIG. 12, the system 12 may include a flexible elongated member 126 configured to be coupled to the tarp T. The flexible elongated member 126 may be a rope, chain, cable, strap, or other device sturdy enough to pull the weight of the tarp T and flexible enough to be routed over the roller assemblies 32, 34 without breaking. Assuming the tarp-raising assemblies 36, 37 are installed laterally aligned with one another across the trailer 10, the user can coil and throw the elongated member 126 over the top of the roller assemblies 32, 34. For example, the user can stand on the first lateral side 14 of the trailer 10 and throw the coiled flexible elongated member 126 over the roller assemblies 32, 34 toward the second lateral side 16 of the trailer 10. This can be done before or after the elongated member 126 is coupled to the tarp T. At least one of the supporting assemblies 22, 24 (in this example, the second supporting assembly 24, which is opposite the lateral side 14 on which the tarp T is located in FIG. 1) includes the pulling mechanism 46, which is configured to pull the elongated member 126 and thereby pull the tarp T up along the first lateral side 14 of the trailer 10, over the first and second roller assemblies 32, 34, and down toward the second lateral side 16 of the trailer 10.

As shown in FIG. 12, an attachment assembly 128 is configured to couple the elongated member 126 to the tarp T. The attachment assembly 128 comprises a generally triangular member 130 having a first end 132 configured to be coupled to the elongated member 126 and a second end 134 opposite the first end 132 configured to be coupled to the tarp T. The first end 132 is narrower than the second end 134, and as shown, ends almost at a point, although the corner of the point is removed. This narrower first end 132 of the triangular member 130 is the leading end that rolls over the roller assemblies 32, 34 first. The near-point helps to guide the triangular member 130 and thus the tarp T over the center of the roller assemblies 32, 34, lessening the likelihood the tarp T will slip off the ends of the rollers 54a, 54b. Additionally, because the first end 132 of the triangular member 130 is connected to the elongated member 126, this means there is not excess material on either side of the elongated member 126 that might otherwise hang down and get caught in the roller assemblies 32, 34. The base and height of the triangular member 130 can be designed as appropriate for the application. In the present example, the base of the triangular member 130 has a slightly shorter dimension than the combined width of the rollers 54a, 54b and connecting member 118, which is about the dimension of a tarp T that has been folded over on itself several times. The triangular member 130 is made of a flexible and durable material, and in this example is made of tarp. In other examples, the triangular member 130 could be made of a flexible polymer sheet or rope or chain netting.

The attachment assembly 128 further comprises a holding mechanism 136 on the second end 134 of the triangular member 130 that is configured to couple the attachment assembly 128 to the tarp T. The holding mechanism 136 may be a series of clamps 138 as shown herein, or may be a series of carabineers, hooks, or other attachment devices capable of removably holding several layers of folded tarp. The attachment assembly 128 further comprises a rod 140 made of a less flexible material than that of the triangular member 130 attached along the second end 134 of the triangular member 130. For example, the rod 140 can be made of plastic, metal, or an elastomer. The relative rigidity of the rod 140 with respect to the triangular member 130 and the tarp T keeps the tarp T from folding up further while it is being pulled over the roller assemblies 32, 34. Additionally, the rod 140 may serve as an anchor for the holding mechanism 136. For example, the clamps 138 may have hooks or rings on their ends that attach around the rod 140. Alternatively, the clamps 138 may be integral with the rod 140 or bolted or otherwise attached thereto. The rod 140 may provide a sturdier, more durable anchor for the clamps 138 than the flexible triangular member 130 would otherwise provide. The rod 140 can be inserted inside a pocket 141 formed at the second end 134 of the triangular member 130.

Figure 13:
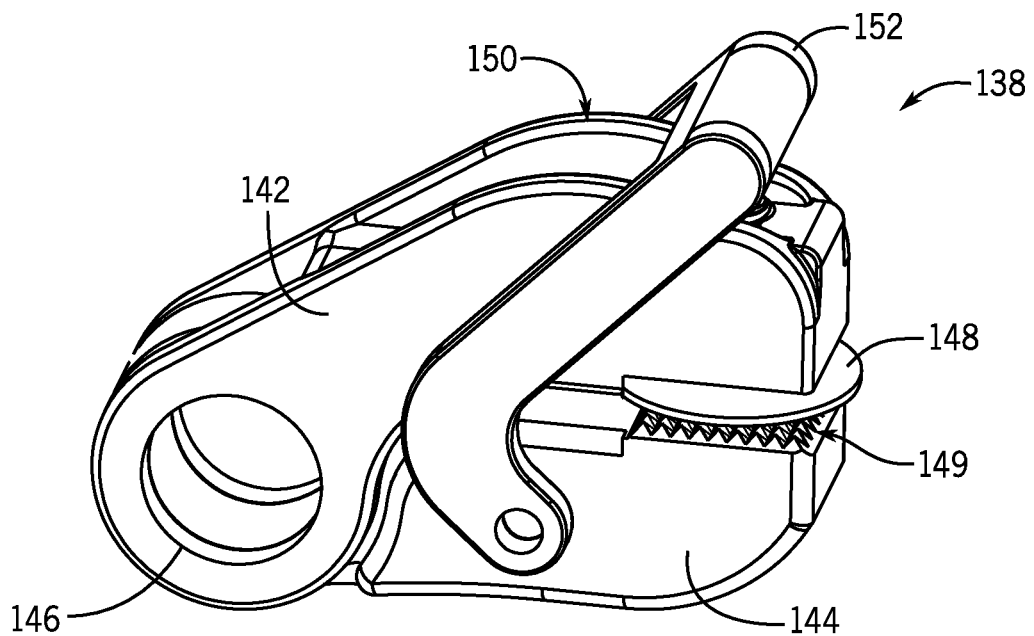
FIGS. 13 and 14 show details of portions of the attachment assembly of FIG. 12.

While the exact type of clamp may vary from that shown herein, one example is shown in FIG. 13. The clamp 138 includes an upper arm 142 and a lower arm 144. A ring 146 at one end of the upper arm 142 is configured to slide around the rod 140. At the other end of the upper arm 142, the clamp 138 includes a spring-loaded disc 148 for pressing the tarp T against a knurled surface 149 on the lower arm 144. The upper arm 142 has a cammed upper surface 150 over which a locking handle 152 rides to tighten or loosen the clamp 138.

Figure 14:
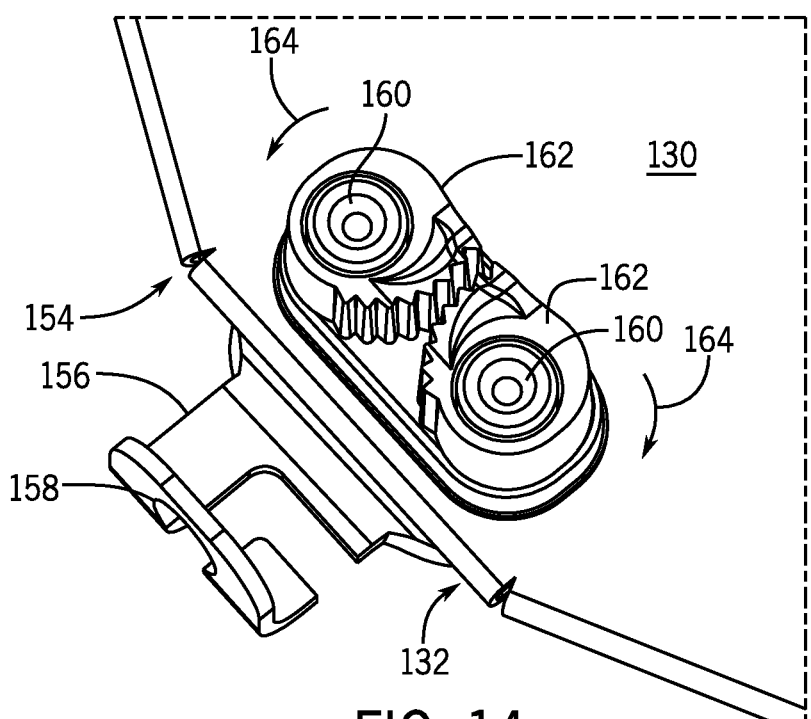

As shown in FIG. 14, at the narrower first end 132 of the triangular member 130, the attachment assembly 128 includes a holding mechanism 154 for coupling the elongated member 126 to the triangular member 130. The holding mechanism 154 includes a bracket 156 with an aperture 158 for insertion of the elongated member 126. The bracket 156 is held to the triangular member 130 on the opposite face from that shown by a pair of fasteners 160, such as bolts, pins, or rivets. The fasteners 160 also hold a pair of opposed toothed members 162, which are rotatable in the direction of arrows 164 to open the gap there between for insertion of the elongated member 126. Rotation of the toothed members 162 in opposite directions brings the teeth closer together, thereby gripping the elongated member 126. Of course, the end of the elongated member 126 that protrudes from the toothed members 162 may be knotted, crimped, or tied to a washer to further prevent it from pulling back through the toothed members 162 and the aperture 158 in the bracket 156. In other examples, a pocket or grommet could be provided at the first end 132 of the triangular member 130 for insertion of the elongated member 126, and/or the elongated member 126 could be sewn to the triangular member 130.

Returning to FIGS. 4-7, once the elongated member 126 is thrown over the roller assemblies 32, 34 and connected to the tarp T (for example, by way the attachment assembly 128, although other assemblies and/or methods could be used), the pulling mechanism 46 is used to pull the elongated member 126 and tarp T up the side of the trailer 10 and load L and over the roller assemblies 32, 34. The user may shift the elongated member 126 such that it rides in the circumferential groove 120 in the connecting member 118, thereby keeping the attachment assembly 128 and tarp T relatively centered on the roller assemblies 32, 34. The pulling mechanism 46 in this example is a windlass 166 configured to receive the elongated member 126 through an opening 168 (FIGS. 6, 7) in an upper side of its housing 170. As shown in FIG. 6, the user can pivot a spring-loaded finger 172 away from the housing 170 while routing the elongated member 126 through the housing 170. The elongated member 126 is forced to exit the housing 170 through an opening 174 upon contacting a curved guiding surface 175. Once the elongated member 126 exits the housing 170 through the opening 174, the user can release the spring-loaded finger 172, which then bears against the elongated member 126, maintaining it securely within the housing 170.

As is known, the windlass 166 is designed to clamp onto the elongated member 126 by tightening of a cover 176 on the housing 170 that presses the elongated member 126 against a notched, grooved, or toothed surface 178 on a rotatable disc 180 (shown in FIG. 6, from which the cover 176 of the windlass 166 has been removed) that engages the elongated member 126 in a manner such that rotation of the disc 180 about axis 182 pulls the elongated member 126 through the windlass 166. In the present example, the pulling mechanism 46 is configured to be mechanically actuated to pull the elongated member 126. More specifically, the pulling mechanism 46 includes a gearbox 184 holding gears coupled to an input shaft 186 (FIG. 4). The input shaft 186 can be mechanically rotated by an electric drill with the correct attachment, thereby rotating an input gear (not shown) in the gearbox 184. The input gear can be part of a gear set (not shown) in the gearbox 184 that rotates an output shaft 188 that extends along the axis 182 and holds the disc 180. Thus, rotation of the input shaft 186 results in rotation of the output shaft 188 and pulling of the elongated member through the windlass 166.

In other examples, the input shaft 186 can be manually rotated, such as by way of a hand crank. In other examples, the input shaft 186 is directly connected to the disc 180 and a higher-powered device can be used to rotate the input shaft 186. In still other examples, the pulling mechanism 46 is not a windlass 166, but is instead a winch. Alternatively, the pulling mechanism 46 (whether a windlass 166 or not) can be provided elsewhere on the tarp-raising assembly 36, 37, instead of on the supporting assembly 22, 24. In still other examples, the pulling mechanism 46 is not included, and the user pulls the elongated member 126 by hand over the roller assemblies 32, 34.

As noted herein above, only one pulling mechanism 46 on the side of the trailer 10 opposite where the tarp T is located is required, as that pulling mechanism 46 pulls the tarp T over the roller assemblies 32, 34. However, it may be desirable to provide the pulling mechanism 46 on both tarp-raising assemblies 36, 37 in order to provide the user with flexibility as to what side of the trailer 10 the tarp T will start on, without needing to plan which tarp-raising assembly 36, 37 should be installed on which side of the trailer 10.

Once the tarp T is pulled over the load L, the post assemblies 28, 30 can be lowered. This can be done by releasing the spring locks 92 in the upper posts 48 and allowing the upper posts 48 to retract into the lower posts 50. The spring locks 90 holding the lower posts 50 in the main bodies 40 of the supporting assemblies 22, 24 can then be released to allow the lower posts 50 to be lowered to the ground. The roller assemblies 32, 34 can then be removed from the upper end caps 100 of the upper posts 48. The supporting assemblies 22, 24 can be removed from the stake pockets 26 by pushing the shims 64 upwards with respect to the elongated portions 44 of the brackets 42, thereby narrowing the combined total width of the shims 64 and the elongated portions 44 and allowing the brackets 42 to be removed from the stake pockets 26. The disassembled tarp-raising assemblies 36, 37 can then be re-assembled at another location along the lateral sides 14, 16 of the trailer 10 in order to pull another tarp over another portion of the load L. Each tarp T, which was folded while being pulled over the load L, can then be unfolded over the load L. This process can be repeated until the entire load L is covered, after which the disassembled tarp-raising assemblies 36, 37 can be stored for the next use. The tarp-raising assemblies 36, 37 can also be installed to aid in removing the tarps T. For example, the user can install the tarp-raising assemblies 36, 37 under the tarp T, raise the post assemblies 28, 30, and pull the tarp T (folded or unfolded) back over the load L with the aid of roller assemblies 32, 34.

Although the present tarp-raising assemblies 36, 37 are shown and described as being used for a tarp, they could be used to raise and/or support any type of flexible material to be placed over a load on a trailer, such as a net, plastic sheeting, etc.

Although only two post assemblies 28, 30 with two roller assemblies 32, 34 supported thereupon are used to pull one tarp T across the trailer 10, four post assemblies (two on each lateral side 14, 16 of the trailer 10) and a roller assembly extending in the longitudinal direction of the trailer 10 and supported between the two post assemblies on each side of the trailer 10 could instead be used to pull one unfolded tarp, or multiple folded tarps, across the trailer 10. In other examples, only one tarp-raising assembly 36 or 37 may be needed to cover a particular load L on a trailer 10, such as if the load L is narrow or not very high. In such an example, the supporting post 102 of the roller assembly 32, 34 could be angled inwardly over the load L to provide clearance of the tarp T over the load L.

Furthermore, the supporting assemblies 22, 24 can be used for purposes other than holding the post assemblies 28, 30. For instance, the supporting assemblies 22, 24 can be used to hold the frame members of a trailer side kit. In such an instance, the pulling mechanisms 46 may or may not be required. The internal shape and size of the main body 40 can be designed to hold whatever post is being used, while the advantages of the adjustable-width bracket 42 that is inserted from the below the stake pocket 26 are utilized.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies and methods described herein may be used alone or in combination with other assemblies and methods. It is to be expected that various equivalents, alternatives and modifications are possible.

What is claimed is:

1. A system for covering a load on a trailer with a tarp, the system comprising:
    a first supporting assembly configured to be supported in a first stake pocket on a first lateral side of the trailer;
    a first post assembly configured to be held vertically upright by the first supporting assembly;
    a first roller assembly configured to be supported at an upper end of the first post assembly such that the first roller assembly extends horizontally and is aligned with the first lateral side of the trailer; and
    a second supporting assembly configured to be supported in a second stake pocket on an opposite second lateral side of the trailer;
    a second post assembly configured to be held vertically upright by the second supporting assembly; and
    a second roller assembly configured to be supported at an upper end of the second post assembly such that the second roller assembly extends horizontally and is aligned with the second lateral side of the trailer;
    wherein the first and second roller assemblies are configured to be aligned with one another to support a tarp, such that the tarp can be pulled up along the first lateral side of the trailer, over the first and second roller assemblies, and down toward the second lateral side of the trailer to cover a load on the trailer; and wherein the system further comprises:

a flexible elongated member configured to be coupled to the tarp and by way of which the tarp can be pulled up along the first lateral side of the trailer, over the first and second roller assemblies, and down toward the second lateral side of the trailer; and an attachment assembly configured to couple the elongated member to the tarp, the attachment assembly comprising a generally triangular member having a first end configured to be coupled to the elongated member and a second end opposite the first end configured to be coupled to the tarp, the first end being narrower than the second end.

2. The system of claim 1, wherein the first and second supporting assemblies each comprise a hollow main body configured to receive the respective first or second post assembly therein.

3. A system for covering a load on a trailer with a tarp, the system comprising:

a first supporting assembly configured to be supported in a first stake pocket on a first lateral side of the trailer;

a first post assembly configured to be held vertically upright by the first supporting assembly;

a first roller assembly configured to be supported at an upper end of the first post assembly such that the first roller assembly extends horizontally and is aligned with the first lateral side of the trailer; and a second supporting assembly configured to be supported in a second stake pocket on an opposite second lateral side of the trailer;

a second post assembly configured to be held vertically upright by the second supporting assembly; and a second roller assembly configured to be supported at an upper end of the second post assembly such that the second roller assembly extends horizontally and is aligned with the second lateral side of the trailer;

wherein the first and second roller assemblies are configured to be aligned with one another to support a tarp, such that the tarp can be pulled up along the first lateral side of the trailer, over the first and second roller assemblies, and down toward the second lateral side of the trailer to cover a load on the trailer;

wherein the first and second supporting assemblies each comprise a hollow main body configured to receive the respective first or second post assembly therein; and wherein the first and second supporting assemblies each comprise a bracket extending from the main body, the bracket having an elongated portion extending alongside the main body, the elongated portion configured to be inserted into the respective first or second stake pocket such that the main body is suspended outwardly of the respective first or second lateral side of the trailer.

4. The system of claim 3, wherein the first and second supporting assemblies each comprise a shim configured to slide vertically and horizontally with respect to the elongated portion of the bracket such that a combined lateral width of the elongated portion of the bracket and the shim can be adjusted to fill a width of the respective first or second stake pocket.

5. The system of claim 3, wherein the elongated portion extends from a lower portion of the main body and upwardly alongside the main body and is configured to be inserted into the respective first or second stake pocket from below the respective first or second stake pocket.

6. The system of claim 1, wherein the second supporting assembly comprises a pulling mechanism configured to pull the elongated member and thereby pull the tarp up along the first lateral side of the trailer, over the first and second roller assemblies, and down toward the second lateral side of the trailer.

7. The system of claim 6, wherein the pulling mechanism is a windlass configured to receive the elongated member.

8. The system of claim 6, wherein the pulling mechanism is configured to be mechanically actuated to pull the elongated member.

9. The system of claim 1, wherein the attachment assembly further comprises a holding mechanism on the second end of the triangular member that is configured to couple the attachment assembly to the tarp.

10. The system of claim 1, wherein the triangular member is made of a flexible material and the attachment assembly further comprises a rod made of a less flexible material attached along the second end of the triangular member.

11. A system for covering a load on a trailer with a tarp, the system comprising:

a first supporting assembly configured to be supported in a first stake pocket on a first lateral side of the trailer;

a first post assembly configured to be held vertically upright by the first supporting assembly;

a first roller assembly configured to be supported at an upper end of the first post assembly such that the first roller assembly extends horizontally and is aligned with the first lateral side of the trailer; and a second supporting assembly configured to be supported in a second stake pocket on an opposite second lateral side of the trailer;

a second post assembly configured to be held vertically upright by the second supporting assembly; and a second roller assembly configured to be supported at an upper end of the second post assembly such that the second roller assembly extends horizontally and is aligned with the second lateral side of the trailer;

wherein the first and second roller assemblies are configured to be aligned with one another to support a tarp, such that the tarp can be pulled up along the first lateral side of the trailer, over the first and second roller assemblies, and down toward the second lateral side of the trailer to cover a load on the trailer; and wherein the first and second roller assemblies each comprise:

a horizontally extending beam coupled to the upper end of the respective first or second post assembly;

a first bracket coupled to a first end of the beam and a second bracket coupled to a second end of the beam;

a first bearing supported above the beam by a first spindle supported by the first bracket;

a second bearing supported above the beam by a second spindle supported by the second bracket; and at least one horizontally extending roller supported by the first and second bearings and rotatable about an axis of rotation defined by the first and second spindles.

12. The system of claim 11, wherein the first and second roller assemblies each further comprise first and second wheels supported by the respective first and second spindles opposite the respective first and second bearings and rotatable about the axis of rotation, the first and second wheels each having an outer diameter larger than an outer diameter of the at least one roller.

13. A system for covering a load on a trailer with a tarp, the system comprising:
- a first supporting assembly configured to be supported in a first stake pocket on a first lateral side of the trailer;
- a first post assembly configured to be held vertically upright by the first supporting assembly;
- a first roller assembly configured to be supported at an upper end of the first post assembly such that the first roller assembly extends horizontally and is aligned with the first lateral side of the trailer; and
- a second supporting assembly configured to be supported in a second stake pocket on an opposite second lateral side of the trailer;
- a second post assembly configured to be held vertically upright by the second supporting assembly; and
- a second roller assembly configured to be supported at an upper end of the second post assembly such that the second roller assembly extends horizontally and is aligned with the second lateral side of the trailer;
- wherein the first and second roller assemblies are configured to be aligned with one another to support a tarp, such that the tarp can be pulled up along the first lateral side of the trailer, over the first and second roller assemblies, and down toward the second lateral side of the trailer to cover a load on the trailer; and
- wherein the first and second post assemblies each comprise at least two telescoping posts, which telescoping posts are manually slidable with respect to the respective first or second supporting assembly and with respect to each other.

14. A system for covering a load on a trailer with a tarp, the system comprising:
- a post assembly configured to be coupled to a first lateral side of the trailer;
- a supporting assembly configured to be supported in a stake pocket on the first lateral side of the trailer and configured to hold the post assembly vertically upright; and
- a roller assembly configured to be supported at an upper end of the post assembly such that the roller assembly extends horizontally and is aligned with the first lateral side of the trailer;
- wherein the roller assembly is configured to support a tarp thereupon such that the tarp can be pulled up along the first lateral side of the trailer, over the roller assembly, over a load on the trailer, and down toward an opposite second lateral side of the trailer; and
- wherein the system further comprises:
- a flexible elongated member configured to be coupled to the tarp; and
- a mechanically actuated pulling mechanism configured to be coupled to the second lateral side of the trailer and configured to pull the flexible elongated member and thereby pull the tarp up along the first lateral side of the trailer, over the roller assembly, and down toward the second lateral side of the trailer.

15. The system of claim 14, wherein the supporting assembly comprises:
- a hollow main body configured to receive the post assembly therein; and
- a bracket extending from a side of the main body, the bracket having an elongated portion extending alongside the main body, the elongated portion configured to be inserted into the stake pocket such that the main body is suspended outwardly of the first lateral side of the trailer.

16. The system of claim 15, wherein the supporting assembly further comprises a shim configured to slide vertically and horizontally with respect to the elongated portion of the bracket such that a combined lateral width of the elongated portion of the bracket and the shim can be adjusted to fill a width of the stake pocket.

17. The system of claim 14, further comprising an attachment assembly configured to couple the elongated member to the tarp, the attachment assembly comprising a generally triangular member having a first end configured to be coupled to the elongated member and a second end opposite the first end configured to be coupled to the tarp by way of a holding mechanism, the first end being narrower than the second end.

18. The system of claim 14, wherein the roller assembly comprises:
- a horizontally extending beam coupled to the upper end of the post assembly;
- a first bracket coupled to a first end of the beam and a second bracket coupled to a second end of the beam;
- a first bearing supported above the beam by a first spindle supported by the first bracket;
- a second bearing supported above the beam by a second spindle supported by the second bracket;
- at least one horizontally extending roller supported by the first and second bearings and rotatable about an axis of rotation defined by the first and second spindles; and
- first and second wheels supported by the respective first and second spindles opposite the respective first and second bearings and rotatable about the axis of rotation, the first and second wheels each having an outer diameter larger than an outer diameter of the at least one roller.

* * * * *